United States Patent [19]

Evans, Jr.

[11] 4,210,067
[45] Jul. 1, 1980

[54] METHOD OF AND APPARATUS FOR MAKING AIR FILTERS

[75] Inventor: Alton Evans, Jr., Utica, Ohio

[73] Assignee: Owens-Corning Fiberglas Corporation, Toledo, Ohio

[21] Appl. No.: 947,385

[22] Filed: Oct. 2, 1978

[51] Int. Cl.² .................... B31B 1/26; B01D 46/10
[52] U.S. Cl. .................... 93/1 F; 55/DIG. 31; 93/84 R
[58] Field of Search .............. 93/1 F, 49 R, 84 R; 55/501, 511, DIG. 31; 271/198

[56] References Cited

U.S. PATENT DOCUMENTS

| | | | |
|---|---|---|---|
| 2,219,115 | 10/1940 | Sackner et al. | 93/84 R |
| 2,351,670 | 6/1944 | Desch et al. | 93/49 R |
| 3,808,958 | 5/1974 | Keener et al. | 93/49 R |
| 4,086,071 | 4/1978 | Champlin | 55/501 |

Primary Examiner—Robert D. Baldwin
Attorney, Agent, or Firm—Ronald C. Hudgens; Philip R. Cloutier; Paul J. Rose

[57] ABSTRACT

Generally rectangular paperboard frame blanks are fed separately into a horizontal position from a stack at one end of a first leg portion of an L-shaped assembly line, and air filter mats are fed respectively to the frame blanks. Each edge portion of a frame blank is scored to provide three spaced parallel fold lines. As each frame blank with an air filter mat is conveyed along the assembly line, glue is applied along two spaced parallel glue lines on each of a first pair of opposite edge portions and the edge portions are doubly folded. Then the blank and mat are shifted at right angles and conveyed along the second leg portion of the L-shaped assembly line where the gluing and folding operations are repeated for the second pair of opposite edge portions.

2 Claims, 5 Drawing Figures

METHOD OF AND APPARATUS FOR MAKING AIR FILTERS

This application relates generally to air filters, and more particularly to a method of and apparatus for making air filters of the type used principally in hot air heating system.

An object of the invention is to provide a method of and apparatus for making air filters.

Other objects will become apparent when the following specification is considered along with the accompanying drawings in which.

Figure 1:
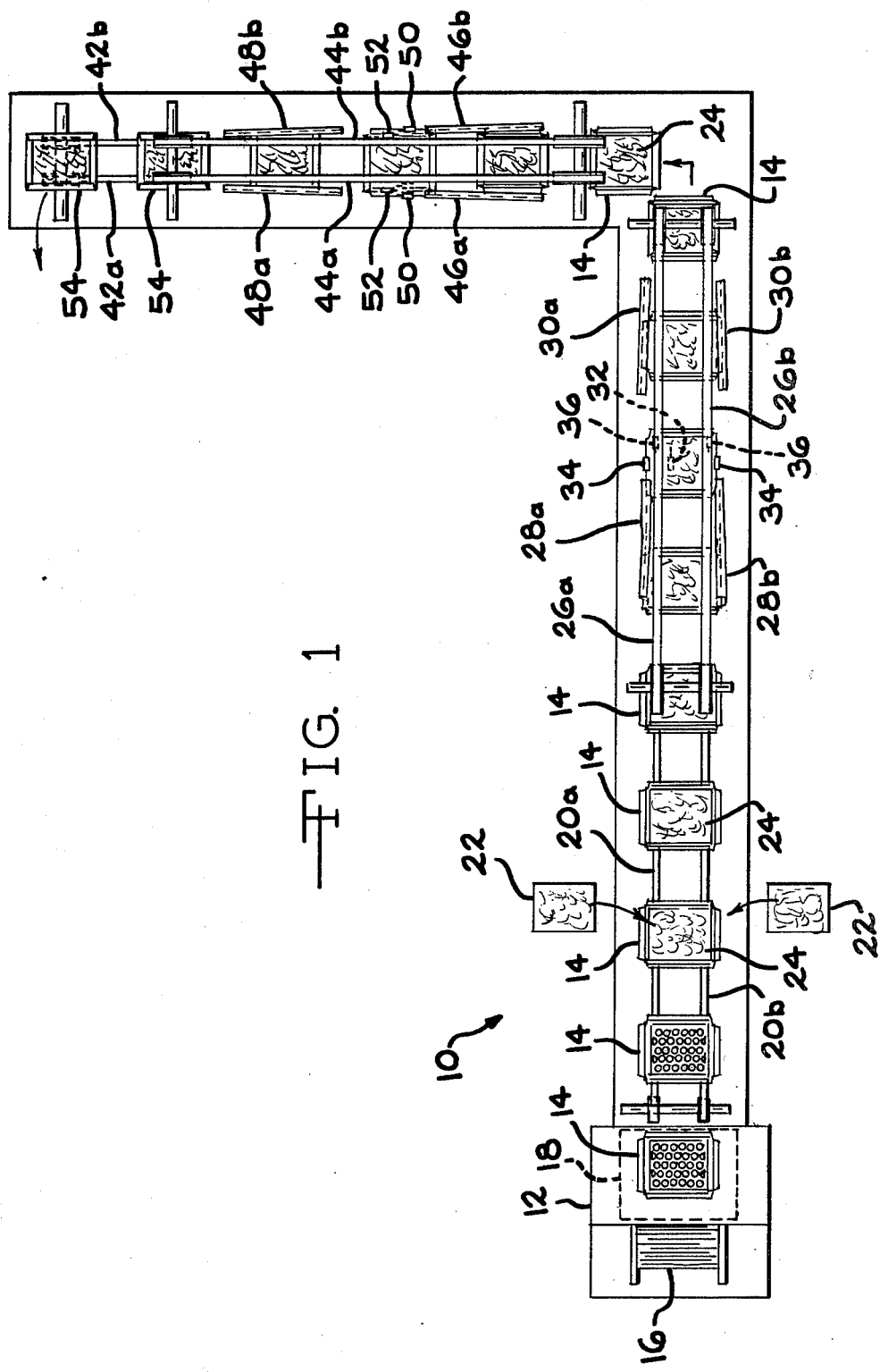
FIG. 1 is a schematic plan view of air filter making apparatus constructed in accordance with the invention.
Figure 2:
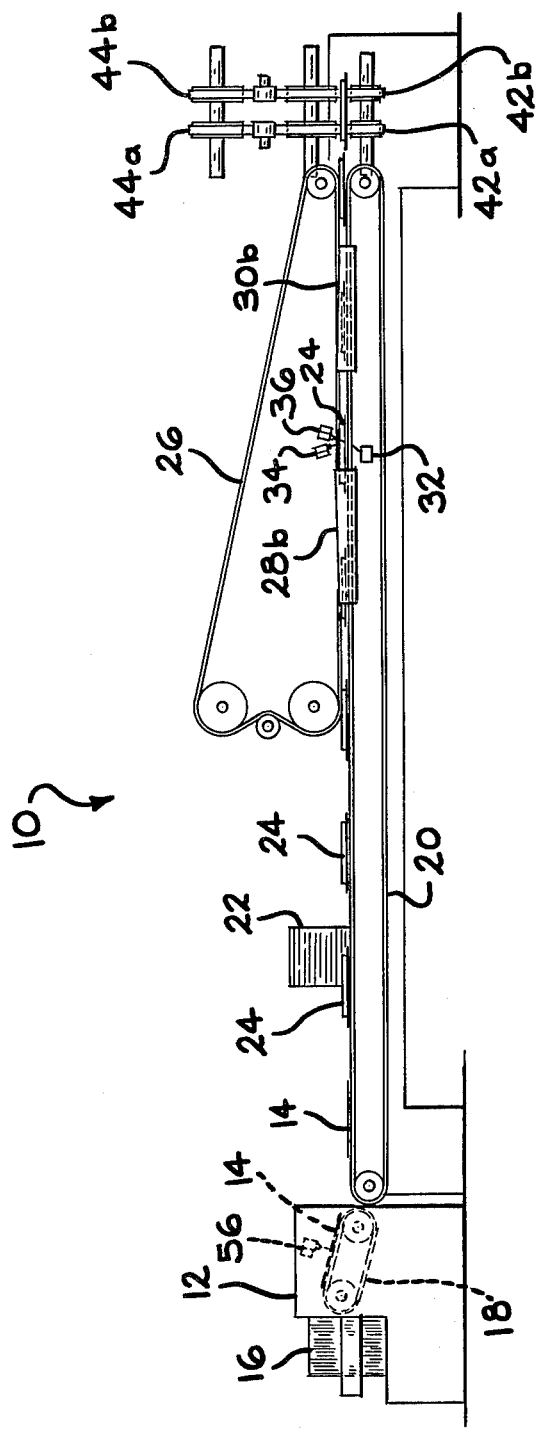
FIG. 2 is an elevational view of the apparatus of FIG. 1.

With respect to the drawings, FIGS. 1 and 2 illustrate an L-shaped assembly line or apparatus 10 constructed in accordance with the invention to make air filters of the type having a collapsible frame, which are compressible into compact packages for shipment, such a filter being shown in U.S. Pat. No. 4,086,071 issued to Charles L. Champlin on Apr. 25, 1978. The apparatus 10 includes a conventional frame blank feeder 12 which automatically feeds paper board filter frame blanks 14 one at a time from a stack 16 in which they are substantially vertically oriented and rotates them to a substantially horizontal position on a relatively short downwardly inclined endless belt conveyor 18. From the conveyor 18 the blanks 14 pass to a relatively long endless belt conveyor 20 including a pair of endless belts 20a and 20b.

In the embodiment of the invention illustrated, stacks 22 of filter mats 24 are provided on opposite sides of the conveyor 20 for manual feeding of mats 24 alternately from opposite sides to the blanks 14 as they pass by. As each blank 14 with a mat 24 thereon progresses, it is gripped by an upper endless belt conveyor 26 including a pair of endless belts 26a and 26b which are driven at the same lineal speed as the belts 20a and 20b. The conveyors 20 and 26 force the blank 14 through a first pair of forming shoes 28a and 28b and then through a second pair of forming shoes 30a and 30b.

Figure 3:
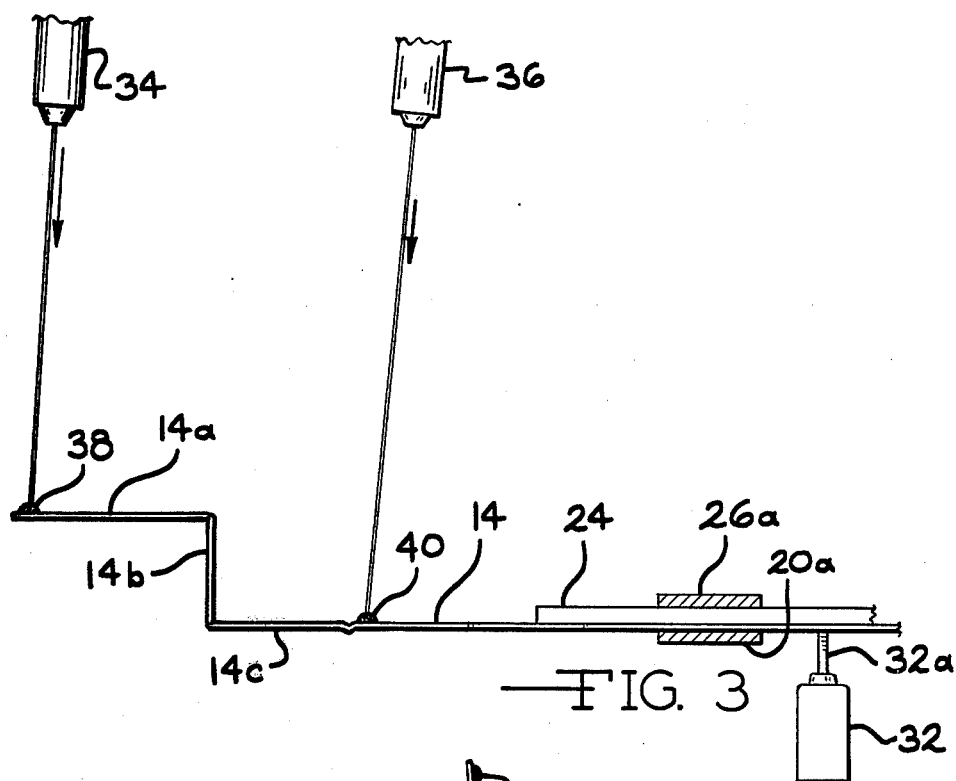
FIG. 3 is a fragmentary schematic elevational view illustrating the application of glue to a partially folded edge portion of a paperboard frame blank.
Figure 4:
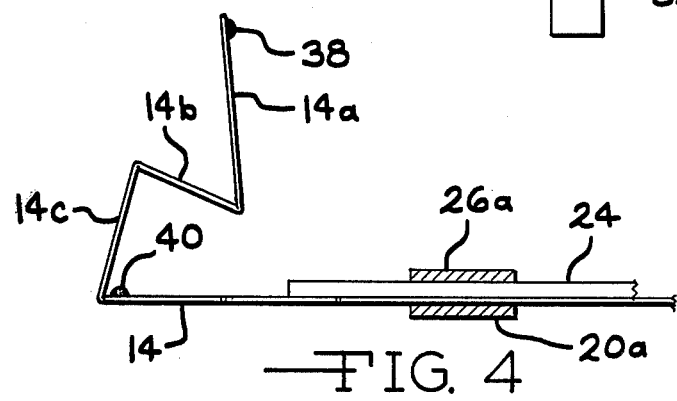
FIGS. 4 and 5 are fragmentary elevational views illustrating further folding of the edge portion of the frame blank of FIG. 3.
Figure 5:
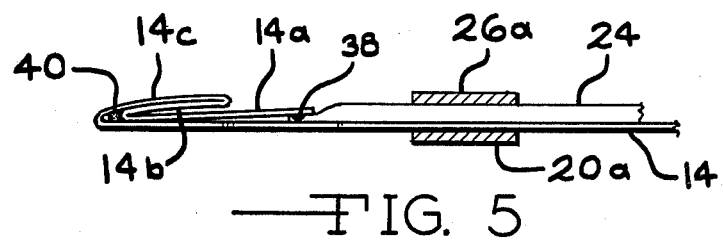

The paperboard filter frame blanks 14 are generally rectangular with corner portions cut away. Each edge portion of a blank 14 as furnished is scored along three spaced parallel lines. As a blank 14 progesses through the first pair of forming shoes 28a and 28b, each of a first pair of opposite edge portions is progressively bent inwardly along the central scoreline and outwardly along the outermost score line to a shape such as shown in FIG. 3. As the blank 14 emerges from the forming shoes 28a and 28b it engages a trigger 32a of a limit switch 32 beneath the upper flights of the belts 20a and 20b. The switch 32 activates two pairs of glue guns 34 and 36, there being one pair adjacent each of the opposite edge portions of the blank 14. Each gun 34 deposits a strip 38 of glue adjacent the respective extreme edge of the blank 14, and each gun 36 deposits a strip 40 of glue adjacent the respective innermost scoreline on the inner side thereof. As the blank 14 progresses through the second pair of forming shoes 30a and 30b, the first pair of opposite edge portions is bent progressively to the shape shown in FIG. 4 and then finally to the shape shown in FIG. 5, to provide doubly-folded edges on the frame and glue the mat 24 in place at the glue strips 38. Each of the doubly folded edges includes a pair of upper and lower inner folded portions 14b and 14a between an upper outer folded portion 14c and the unfolded portion of the blank, the inner end portion of the lower inner folded portion 14a being glued to an edge portion of the mat 24 by the glue strip 38.

After emerging from between the conveyors 20 and 26 each blank 14 with a first pair of doubly-folded edge portions engages stop means (not shown) and is shifted pneumatically horizontally at right angles for gripping between a pair of lower conveyor belts 42a and 42b and a pair of upper conveyor belts 44a and 44b and movement thereby through a third pair of forming shoes 46a and 46b identical to the first pair of forming shoes 28a and 28b and then through a fourth pair of forming shoes 48a and 48b identical to the second pair of forming shoes 30a and 30b. After emerging from the third pair of forming shoes 46a and 46b the blank 14 has strips of glue deposited on the second pair of opposite edge portions, from two pairs of glue guns 50 and 52, in positions comparable to those of the glue strips 38 and 40. After the blank 14 emerges from the fourth pair of forming shoes 48a and 48b, the second pair of opposite edge portions has been doubly folded and glued the same as the first set, whereby completed filters 54 are ready for packaging and shipment.

As shown in the above mentioned U.S. Pat. No. 4,086,071, the second fold of the doubly folded edges is partly unfolded when a filter 54 is installed for use, and is locked in position with end tabs not here shown. The glue strips such as glue strip 40 glue the outer end portion of the upper outer folded portions 14c to the unfolded portion of the blank 14 adjacent their juncture to provide rigidity to the completed filter 54.

Optionally a pair of guns such as a glue gun 56 shown in FIG. 2 may be provided to deposit a pair of strips of glue on each blank 14 before the mat 24 is deposited thereon, to retain the mat 24 in place before it is gripped between the conveyors 20 and 26.

Various modifications may be made in the structure shown and described without departing from the spirit and scope of the invention.

I claim:

1. Apparatus for making air filters from paperboard filter frame blanks and air filter mats comprising first upper and lower endless belt conveyor means for successively gripping blanks with mats respectively thereon and moving them horizontally in a first direction, first folding and gluing means on each of a pair of transversely opposite sides of the first upper and lower endless belt conveyor means for upwardly doubly folding each of a first pair of opposite edge portions of each of the blanks to provide a pair of upper and lower inner folded portions between an upper outer folded portion and the unfolded portion of the blank, for gluing the inner end portion of the lower inner folded portion to the mat on the blank at each of a first pair of opposite edge portions of the mat, and for gluing the outer end portions of the upper outer folded portions of the doubly folded first pair of opposite edge portions of each of the blanks directly to the unfolded portion of the blank respectively adjacent their junctures therewith, second upper and lower endless belt conveyor means for successively gripping blanks with mats received from the first upper and lower endless belt conveyor means and moving them horizontally in a second direction at right angles to the first direction, and second folding and gluing means on each of a pair of transversely opposite sides of the second upper and lower endless belt conveyor means for upwardly doubly folding each of a second pair of opposite edge portions of each of the blanks to provide a pair of upper and lower inner folded portions between an upper outer folded portion and the unfolded portion of the blank, for gluing the inner end portion of the lower inner folded portion to the mat on the blank at each of a second pair of opposite edge portions of the mat, and for gluing the outer end portions of the upper outer folded portions of the doubly folded second pair of opposite edge portions of each of the blanks directly to the unfolded portion of the blank respectively adjacent their junctures therewith.

2. A method of making an air filter comprising placing an air filter mat on a paperboard filter frame blank, doubly folding each of a first pair of opposite edge portions of the blank upwardly to provide a pair of upper and lower inner folded portions between an upper outer folded portion and the unfolded portion of the blank, gluing the inner end portion of the lower inner folded portion to the mat at each of a first pair of opposite edge portions of the mat, gluing the outer end portions of the upper outer folded portions of the doubly folded first pair of opposite edge portions directly to the unfolded portion of the blank respectively adjacent their junctures therewith, doubly folding each of a second pair of opposite edge portions of the blank upwardly to provide a pair of upper and lower inner folded portions between an upper outer folded portion and the unfolded portion of the blank, gluing the inner end portion of the lower inner folded portion to the mat at each of a second pair of opposite edge portions of the mat, and gluing the outer end portions of the upper outer folded portions of the doubly folded second pair of opposite edge portions directly to the unfolded portion of the blank respectively adjacent their junctures therewith.

* * * * *